United States Patent [19]

Deguchi et al.

[11] Patent Number: 5,084,848

[45] Date of Patent: Jan. 28, 1992

[54] FEEDBACK CONTROL APPARATUS IN AN OPTICAL RECORDING AND REPRODUCING DEVICE

[75] Inventors: Toshihisa Deguchi, Nara; Tomiyuki Numata; Masaru Nomura, both of Tenri; Kunio Kojima, Nara, all of Japan

[73] Assignee: Sharp Kabushiki Kaisha, Osaka, Japan

[21] Appl. No.: 369,124

[22] Filed: Jun. 21, 1989

[30] Foreign Application Priority Data

Jun. 23, 1988 [JP] Japan .................................. 63-157275

[51] Int. Cl.$^5$ .......................... G11B 7/00; G11B 21/10
[52] U.S. Cl. .............................. 369/44.25; 369/44.35; 369/44.34; 369/53; 369/44.28
[58] Field of Search ............... 369/44.27, 44.28, 44.29, 369/44.32, 106, 116, 116.25, 44.34, 44.35, 53

[56] References Cited

U.S. PATENT DOCUMENTS

| | | |
|---|---|---|
| 4,561,080 | 12/1985 | Yamazaki et al. |
| 4,641,020 | 2/1987 | Iwai et al. |
| 4,677,605 | 6/1987 | Abed |
| 4,890,272 | 12/1989 | Ando .................... 369/116 |
| 4,890,273 | 12/1989 | Takeuchi et al. ........ 369/106 |
| 4,918,681 | 4/1990 | Ikeda .................... 369/116 |

FOREIGN PATENT DOCUMENTS 0190438 8/1986 European Pat. Off.
2138179 10/1984 United Kingdom.

OTHER PUBLICATIONS

The English Abstract of Japanese Laid-Open Patent Application No. 61-45421.
The English Abstract of Japanese Laid-Open Patent Application No. 60-157731.
The English Abstract of Japanese Laid-Open Patent Application No. 63-42042.

Primary Examiner—Robert L. Richardson
Assistant Examiner—Nabil Hindi

[57] ABSTRACT

A feedback control apparatus in an optical recording and reproducing device for recording, reproducing and/or erasing data from an optical recording medium projects a light beam emitted from an optical head onto the optical recording medium. The apparatus includes an actuator for controlling the illuminating conditions of the light beam projected onto the optical recording medium, a detection unit for detecting the illuminating conditions of the light beam projected onto the optical recording medium, and a control amplifier for driving the actuator in accordance with a detection signal outputted from the detection unit, thereby controlling the illuminating conditions of the light beam projected onto the recording medium. The apparatus further includes a switching device for selectively switching from a detection signal from the detection unit to a reference signal, or vice versa, and for inputting into the control amplifier, the reference signal having the same signal level as that of a detection signal which is expected to be outputted from the detection unit when the illuminating conditions of the light beam projected onto the recording medium are appropriate. An offset compensation device outputs an offset compensation signal to the control amplifier. The offset compensation signal is set such that a control signal generated in the control amplifier has a predetermined signal level when the reference signal is inputted into the control amplifier. The apparatus prevents a DC offset from being included in the control signal from the control amplifier and reduces the procedures required for adjustment during the manufacturing process without employing expensive parts and devices and the like, thereby lowering the production costs.

7 Claims, 4 Drawing Sheets

FEEDBACK CONTROL APPARATUS IN AN OPTICAL RECORDING AND REPRODUCING DEVICE

FIELD OF THE PRESENT INVENTION

The present invention relates to a feedback control apparatus in an optical recording and reproducing device for recording, reproducing and/or erasing data with use of a recording medium by projecting a light beam thereto, which controls the illuminating conditions of the light beam projected onto the recording medium.

BACKGROUND OF THE PRESENT INVENTION

Optical recording and reproducing devices for recording and/or reproducing data with use of an optical recording medium by projecting a light beam thereto such as optical disk devices, optical card devices, and the like can perform high density recording since the diameter of a bit which is a recording unit of data can be easily arranged to about 1 μm. Thanks to this advantage, the above type of recording and reproducing device has been in a spotlight in recent years as a recording device capable of recording a great amount of information.

In order to constantly perform such high density recording with a bit having a diameter of approx. 1 μm, a tolerance on the order of a submicron is required for the diameter of the bit and focusing control and positioning control of the light beam or the like at the time of recording and reproducing of data.

Therefore, there is generally provided in an optical recording and reproducing device, a feedback control apparatus for executing a control loop which is composed of an actuator for controlling the illuminating conditions such as focusing and the illuminating position of a light beam projected onto a recording medium, a detection unit for detecting the aforementioned illuminating conditions, and a control amplifier for driving the actuator in accordance with an output signal from the detection unit.

Referring to FIG. 4, the control amplifier 10 which is a component of the feedback control apparatus comprises a subtraction circuit 11, a phase lead circuit 12, a phase lag circuit 13 and an amplification circuit 14. These circuits are connected in this order. In the substraction circuit 11, an output signal from the detection unit, according to the illuminating conditions of a light beam projected onto the recording medium, and an offset compensation signal are inputted to obtain the differential therebetween whereby a subtraction process is executed. In the phase lead circuit 12, a phase lag caused by the current-displacement conversion characteristic of the actuator in a high frequency region is electrically compensated so as to obtain a phase margin in the vicinity of the cut-off frequencies of the control loop, thereby preventing the control loop from being unstable.

The function of the phase lag circuit 13 is to increase the loop gain in a low frequency region, thereby improving the stiffness of the overall control loop and controlling errors in low frequency components caused by errors in initially setting the individual devices to be actuated by the actuator. The function of the amplification circuit 14 is to amplify the signal which has been compensated by the phase lead circuit 12 and the phase lag circuit 13 and to output the signal thus amplfied as a control signal for driving the actuator.

The signal level of a detection signal released from the detection unit becomes 0, for example, when the illuminating conditions of the light beam projected onto the recording medium are appropriate. Therefore, if a control amplifier having high accuracy in amplifying and compensating operation is adopted as the control amplifier 10, it will be ensured that the signal level of the control signal outputted from the control amplifier 10 is 0, thereby keeping the actuator in a stationary state.

In contrast, when an operational amplifier for general purpose is used as the operational amplifier comprising the phase lead circuit 12, the phase lag circuit 13, the amplification circuit 14 and the like, a DC offset is likely to be generated in the output signal from the control amplifier 10 due to a minute offset in the output of the operational amplifier caused by the characteristics of the operatational amplifier itself, slight fluctuation in the power voltage applied to the operational amplifier, etc. Such a DC offset tends to increase when increasing the overall gain of the control loop and the gain of the individual circuits which compose the control amplifier 10 to improve the responsiveness of the control loop and accuracy in the follow-up system thereof.

Therefore, even though the signal level of the detection signal outputted from the detection unit is 0, the signal level of the control signal from the control amplifier 10 does not necessarily become 0. This results in the flow of current into the actuator causing the actuator to be driven.

Positional errors X to be generated in the individual devices actuated by the actuator is approximately given by:

$$X = V_{of} \times \Delta X / A$$

wherein
$V_{of}$: DC offset in the control signal released from the control amplifier 10;
$\Delta X$: Sensitivity of the actuator i.e., the ratio of the displacement of the individual devices actuated by the actuator to the voltage being applied to the actuator;
$A$: Overall gain of the control loop.

The above positional errors X may prevent the illuminating conditions of the light beam projected onto the recording medium from being kept in an appropriate condition.

It is theoretically expected that the positional errors X will decrease when the overall gain of the control loop increases, since the positional error X is inversely proportional to the overall gain of the control loop. However, the positional error X practically increases since the DC offset increases in proportion to the increase in the overall gain of the control loop as mentioned above.

Further, when the DC offset increases, the output of the phase lag circuit 13 and amplification circuit 14 which have high-gain low frequency components approach the saturation level and these circuits do not properly work. As a result, it often occurs that the control loop is not normally executed and a control over the illuminating conditions of the optical beam projected onto the recording medium is entirely lost.

To solve the above problem, some conventional feedback apparatus are designed such that an offset compensation signal is entered in the subtraction circuit 11 to execute a differential input, the subtraction circuit being located before the phase lead circuit 12, phase lag circuit 13, and amplification circuit 14 which have high gain, and the signal level of the offset compensation signal is adjusted to a desired level by a variable resistor 15.

That is, in such apparatus, a DC offset caused by a minute offset in the output of the operational amplifier and slight fluctuation in the power voltage or the like is cancelled by the offset compensation signal. For example, when the signal level of the detection signal from the detection unit is 0, the signal level of the control signal released from the control amplifier 10 is controlled to be 0 thereby reducing positional errors.

Such a minute offset in the output signal of the operational amplifier and fluctuation in the power voltage, however, vary depending on operational amplifiers and power units. Therefore, conventionally, every feedback control apparatus in an optical recording and reproducing device is required to be adjusted in the manufacturing process in order to prevent the occurance of DC offsets. This additional adjusting process has brought about a high production cost.

Furthermore, if the power condition or the environment where the apparatus is used changes after adjustment has been done, a minute offset will be generated in the output signal of the operational amplifier and the power voltage will fluctuate. This makes it difficult to positively prevent the increase of DC offsets and an abnormal control operation.

It is naturally possible to employ an operational amplifier of high accuracy and a power unit having a high stability in order to prevent the occurrence of DC offsets, but this also brings about a considerable increase in the production cost.

SUMMARY OF THE PRESENT INVENTION

An object of the present invention is to provide a feedback apparatus in an optical recording and reproducing device, which is capable of positively preventing a DC offset in the control signal released from the control amplifier thereby reducing the adjusting processes in manufacturing without using expensive parts, devices and the like and lowering production cost.

In order to achieve the foregoing object, in the present invention, the feedback control apparatus, in an optical recording and reproducing device for recording, reproducing and/or erasing data with use of an optical recording medium by projecting a light beam emitted from an optical head onto the optical recording medium, comprises an actuator for controlling the illuminating conditions of the light beam projected onto the optical recording medium, a detection unit for detecting the illuminating conditions of the light beam projected onto the optcial recording medium, and a control amplifier for driving the actuator in accordance with a detection signal released from the detection unit, thereby controlling the illuminating conditions of the light beam projected on the recording medium, switching means for selectively switching from a detection signal outputted from the detection unit to a reference signal, or vice versa, for inputting into the control amplifier, the reference signal having the same signal level as that of a detection signal which is expected to be outputted from the detection unit when the illuminating conditions of the light beam projected onto the recording medium are appropriate; and offset compensation means for outputting an offset compensation signal to the control amplifier, the offset compensation signal being set such that a control signal generated in the control amplifier has a predetermined signal level when the reference signal is inputted into the control amplifier.

The offset compensation means may include an A/D converter for converting an analog signal from the control amplifier into a digital signal; a CPU for outputting a digital signal for compensating for an offset in the control amplifier in accordance with the digital signal from the A/D converter; and a D/A converter for converting the digital signal from the CPU into an analog signal thereby outputting an offset compensation signal to the control amplifier.

The D/A converter may be designed so as to maintain the level of the offset compensation signal outputted in accordance with the digital signal from the CPU even after the CPU stops the output of digital signals.

The offset compensation means may be designed so as to change the signal level of the offset compensation signal by fixed values until it reachs a predetermined level in case the control signal outputted from the control amplifier when the reference signal is inputted into the control amplifier has not the predetermined signal level.

Further, the offset compensation means may be designed so as to delay the output of the offset compensation signal which is executed in accordance with the signal level of the output signal from the control amplifier by a corresponding time period to the response time of the control amplifier.

Further, the offset compensation means may be designed so as to execute offset compensation at the time when activating of the feedback control apparatus in the optical recording and reproducing device is initiated.

Still further, the offset compensation means may be designed so as to execute offset compensation at the time when resetting of the feedback control apparatus in the optical recording and reproducing device is executed.

DESCRIPTION OF THE EMBODIMENT

Figure 1:
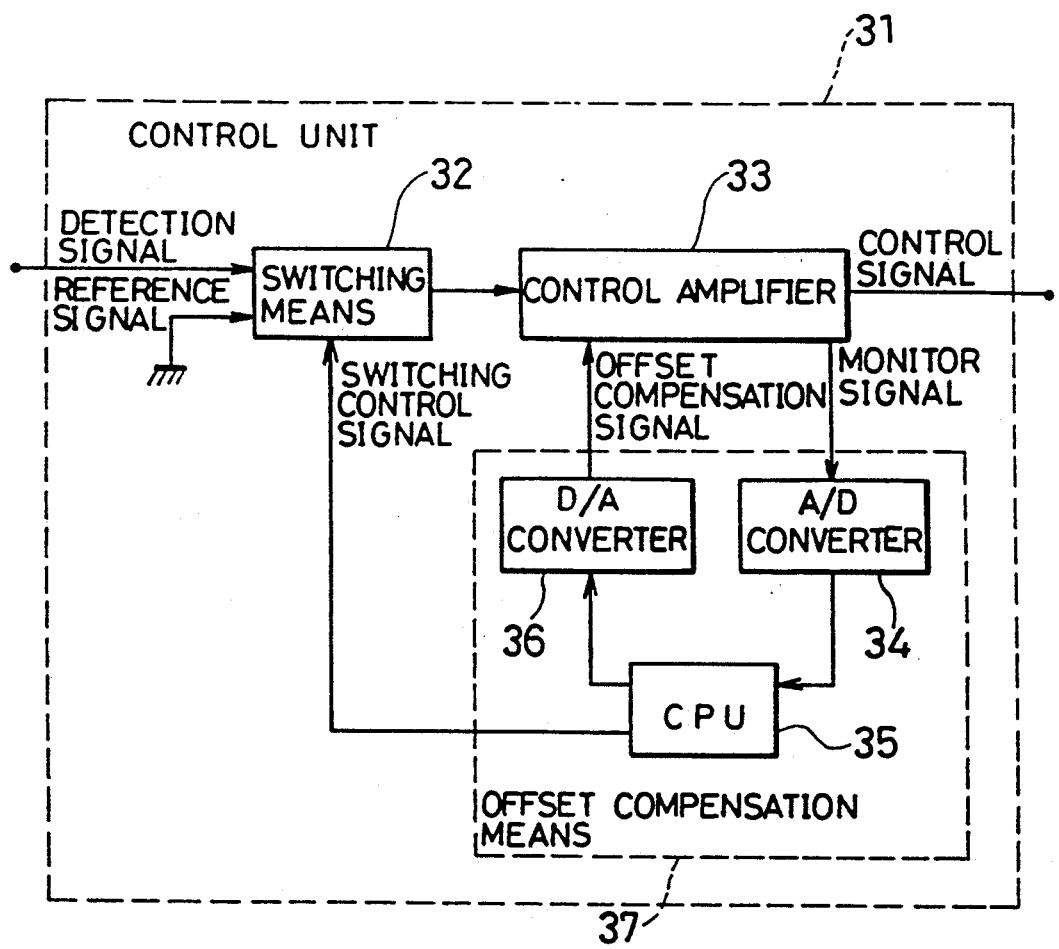
FIG. 1 is a block diagram showing the construction of a control unit disposed in a feedback apparatus in an optical recoding and reproducing device of the present invention.
Figure 2:
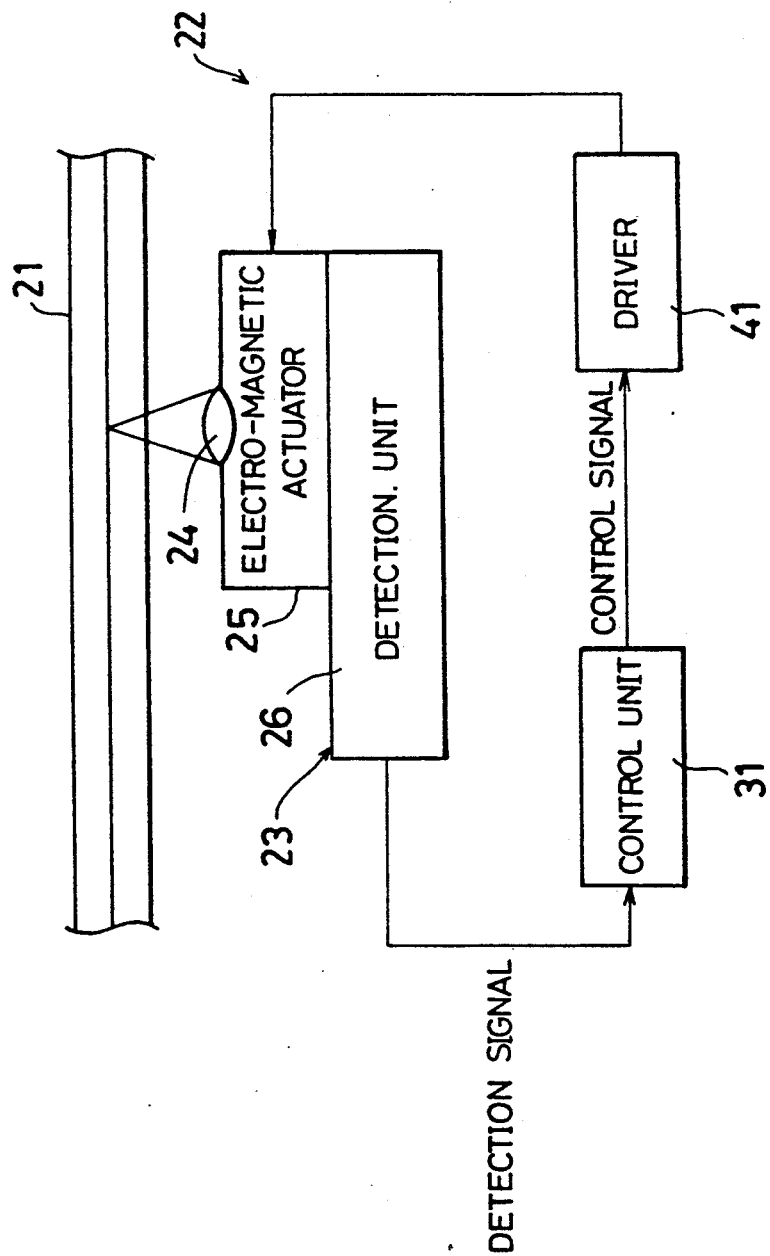
FIG. 2 is a block diagram showing the construction of the feedback control apparatus.
Figure 3:
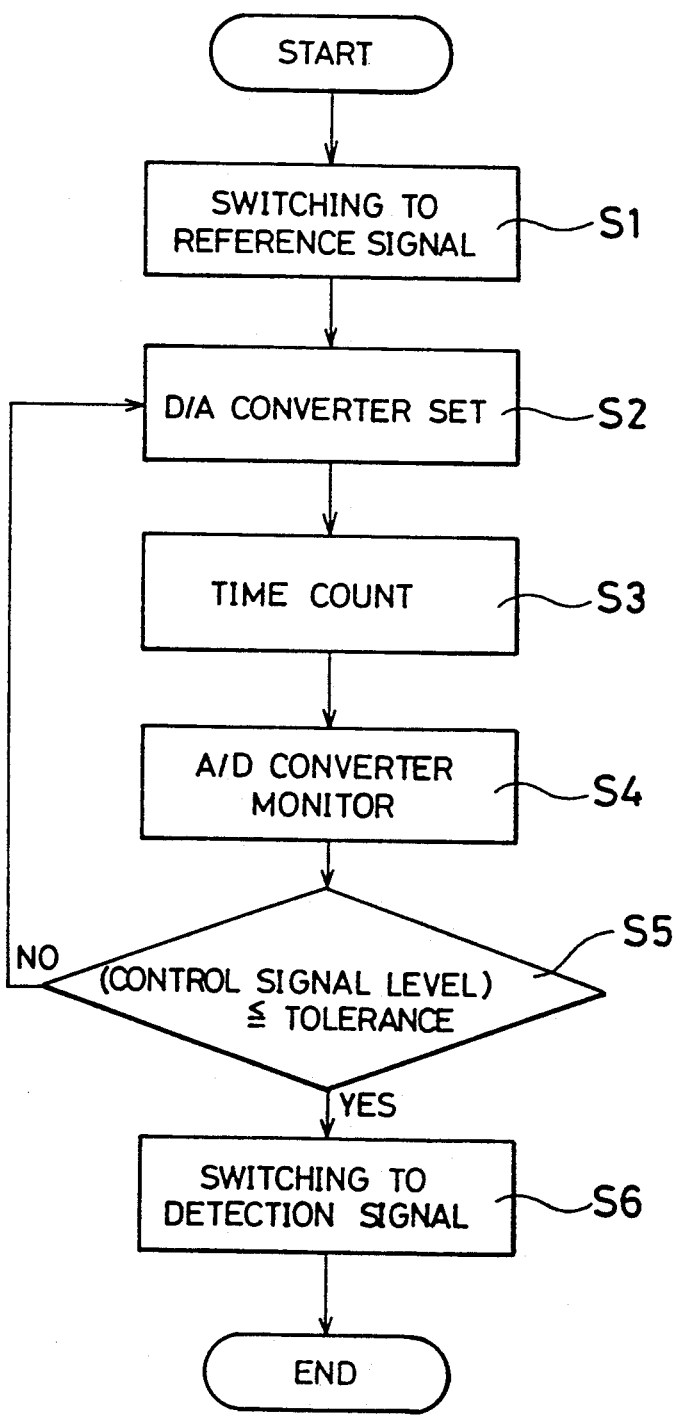
FIG. 3 is a flow chart describing the operations executed by a CPU in an offset compensating means.
Figure 4:
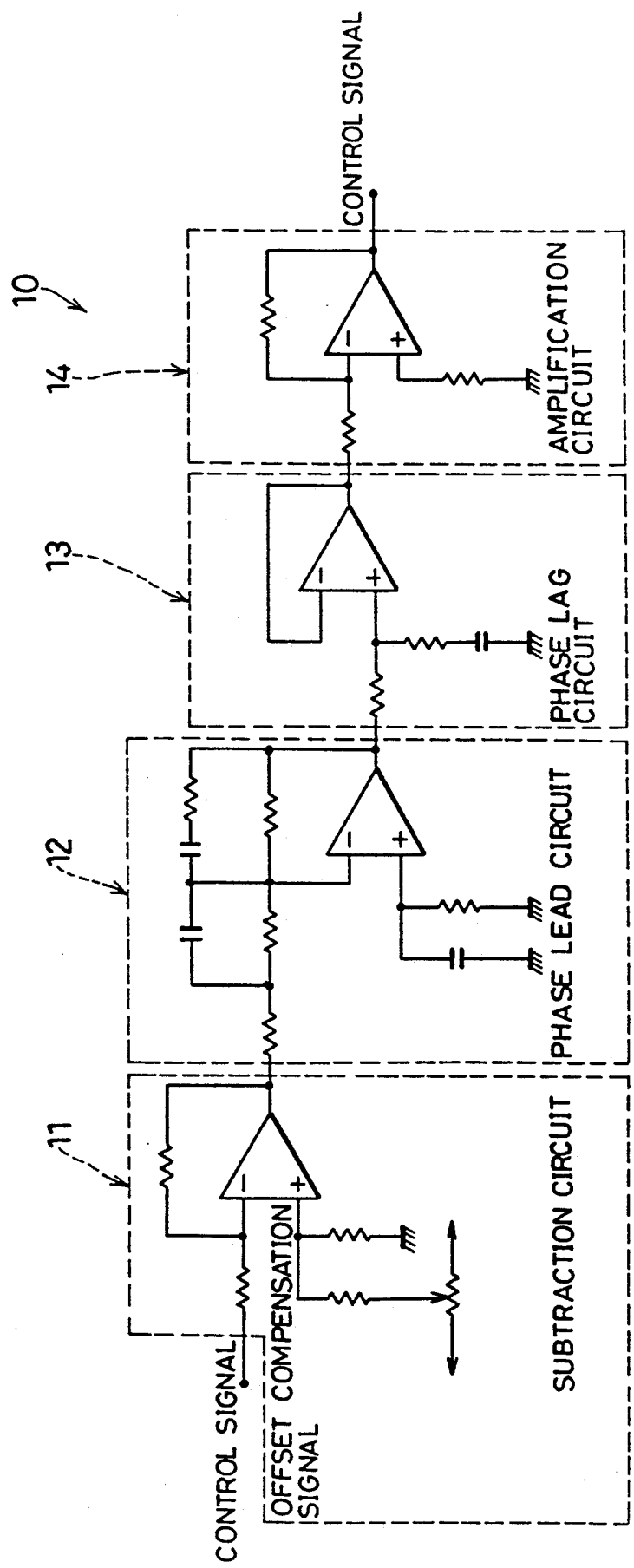
FIG. 4 is a circuit diagram showing the construction of a conventional control amplifier.

Referring now to FIGS. 1 to 3, an embodiment of the present invention will be explained in detail below.

There is provided in a recording and reproducing device for recording, reproducing and/or erasing data with use of a recording medium 21, an optical head 23 for projecting a light beam such as laser light or the like onto the recording medium 21 as shown in FIG. 2. The optical head 23 is provided with a lens 24 for converging light on the recording surface of the recording medium 21 to form a light spot; an electro-magnetic actuator 25 for moving the lens 24 in the direction of an optical axis for example so as to control the illuminating conditions of the optical beam projected onto the recording medium 21, i.e., focusing and positioning of the light beam projected on the recording medium 21 and the like; a detection unit 26 for detecting the illuminating conditions of the light beam projected on the recording medium 21 and outputting a detection signal based thereon.

As the detection unit 26, a detection system with use of astigmatism which is popularly used in a reproducing device for a compact disk, video disk or the like is employed for detecting a focal error and positional error.

This detection unit 26 is connected to a control unit 31. The control unit 31 is, as shown in FIG. 1, provided with switching means 32 in which a detection signal from the detection unit 26 is inputted. A ground level signal, that is, a reference signal having the same signal level as that of a detection signal expected to be outputted from the detection unit 26 when the illuminating conditions of the light beam projected from the optical head 23 onto the recording medium 21 are appropriate, is inputted into the switching means 32. The switching means 32 has a function of selectively switching from the detection signal released from the detection unit 26 to the reference signal, or vise versa for outputting. The signal thus selected and outputted from the switching means 32 is inputted into the control amplifier 33. The control amplifier 33 is designed to output a control signal for driving the actuator in accordance with the detection signal when the detection signal from the detection unit 26 is inputted into the control amplifier 33 via the switching means 32.

The output control signal from the control amplifier 33 is inputted into the driver 41. The control signal inputted into the driver 41 is amplified and then sent to the electromagnetic actuator 25 thereby driving the electro-magnetic actuator 25.

The control amplifier 33 generates a monitor signal indicating the signal level of the control signal and sends it to an A/D converter 34 which performs analog-to-digital conversion. A digital signal outputted from the A/D converter 34 is inputted into a CPU 35 which controls offset compensating operation.

A digital signal from the CPU 35 is inputted into a D/A converter 36 which performs digital-to-analog conversion and an analog signal from the D/A converter 36 is entered in the control amplifier 33 as an offset compensation signal the signal level of which is added to or subtracted from that of the detection signal from the detection unit 26 or the reference signal. The CPU 35 also generates a switching control signal for controlling the switching operation of the switching means 32.

Offset compensation means 37 is provided to set the signal level of an offset compensation signal such that the control signal from the control amplifier 33 has a predetermined signal level in the case the reference signal is sent from the switching means 32 into the control amplifier 33 via the A/D converter 34, the CPU 35 and the D/A converter 36, and send the above offset compensation signal to the control amplifier 33.

A feedback control apparatus 22 for controlling the illuminating conditions of the light beam projected on the recording medium 21 executes a control loop comprising the optical head 23, the electro-magnetic actuator 25, the detection unit 26, the control unit 31 and the drivier 41.

The operations performed by the CPU 35 in the apparatus having the above contstruction will be explained below with reference to the flow chart of FIG. 3.

The offset compensating operation performed by the offset compensation means 37 is one of the initial operations which are automatically carried out, for example, when actuating the recording and reproducing device. This operation is also carried out when resetting the optical recording and reproducing device for some purposes.

In the above cases, the CPU 35 firstly outputs the switching signal to the switching means 32 so that the reference signal of a ground level is inputted into the control amplifier 33 (S1). Then, an initial value is set in the D/A converter 36 to input an offset compensation signal having a predetermined level in the control amplifier 33 (S2).

Addition or subtraction operation is performed on the reference signal thus inputted using the signal level of the offset compensation signal as an addend or subtrahend and the signal obtained from the above operation is compensated for its phase and amplified so as to be outputted from the control amplifier 33 as a control signal. The control amplifier 33 also outputs a monitor signal which indicates the signal level of the control signal. After counting the time period corresponding to the response time of the control amplifier 33 from the input stage to the output stage (S3), the CPU 35 monitors the digital signal which has been converted by the A/D converter 34 in accordance with the monitor signal (S4).

Thereafter, it is judged according to the digital signal from the A/D converter 34 whether or not the signal level of the control signal from the control amplifier 33 is within a predetermined allowable range (S5). More specifically, since there has been inputted into the control amplifier 33 via the switching means 32, the reference signal having the same signal level as that of the detection signal which is expected to be outputted from the detection unit 26 when the illuminating conditions of the light beam projected from the optical head 23 onto the recording medium 21 are appropriate, it can be judged whether a DC offset is properly cancelled by the offset compensation signal by means of judging whether the signal level of the control signal is within e.g. the range of a tolerance.

If it is judged in S5 that the signal level of the control signal from the control amplifier 33 is not within a predetermined allowable range, the CPU 35 returns the program to S2. Afterwards, the CPU 35 newly sets in the D/A converter 36 a value obtained by adding or subtracting a preset value from the value which has been previously set in the D/A converter 36, and then repeats the procedures in S3 to S5.

On the other hand, if it is judged in S5 that the signal level of the control signal from the control amplifier 33 is within a predetermined allowable range, the program proceeds to S6 where the switching control signal is sent to the switching means 32 so that the detection signal from the detection unit 26 is inputted into the control amplifier 33 whereby the control operation over the illuminating conditions of the light beam projected onto the recording medium 21 is properly performed.

In this case, the value set by the CPU 35 is kept in the D/A converter 36 so that the signal level of the offset compensation signal is so maintained as to properly cancel a DC offset as described above until the next offset compensation operation is performed.

For instance, when controlling the focus of the light beam, if the lens 24 is suitably located with respect to the recording position on the surface of the recording medium 21, the amount of the actuating current flowing to the electro-magnetic actuator 25 positively becomes 0, so that it is possible to precisely position the lens 24 to fit to the irregularities of the recording surface thereby preventing the occurrence of remaining errors and unstable operations.

In the foregoing embodiment, the case where DC offset compensation is performed on the overall control amplifier 33 has been explained, but the present invention is not limited to the above embodiment. For example, such DC offset compensation may be respectively carried out with respect to the individual operational amplifiers and control circuits in the control amplifier 33, and a plurality of separated units.

As described above, according to the present invention, the feedback control apparatus in an optical recording and reproducing device for recording, reproducing and/or erasing data with use of an optical recording medium by projecting a light beam emitted from an optical head onto the optical recording medium, which comprises an actuator for controlling the illuminating conditions of the light beam projected onto the optical recording medium, a detection unit for detecting the illuminating conditions of the light beam projected onto the optcial recording medium, and a control amplifier for driving the actuator in accordance with a detection signal outputted from the detection unit, thereby controlling the illuminating conditions of the light beam projected on the recording medium, is characterized by:

switching means for selectively switching from a detection signal outputted from the detection unit to a reference signal, or vice versa, for inputting into the control amplifier, the reference signal having the same signal level as that of a detection signal which is expected to be outputted from the detection unit when the illuminating conditions of the light beam projected onto the recording medium are appropriate; and offset compensation means for outputting an offset compensation signal to the control amplifier, the offset compensation signal being set such that a control signal generated in the control amplifier has a predetermined signal level when the reference signal is inputted into the control amplifier.

The offset compensation means may include an A/D converter for converting an analog signal from the control amplifier into a digital signal; a CPU for outputting a digital signal for compensating for an offset in the control amplifier in accordance with the digital signal from the A/D converter; and a D/A converter for converting the digital signal from the CPU into an analog signal thereby outputting an offset compensation signal to the control amplifier.

The D/A converter may be designed so as to maintain the level of the offset compensation signal outputted in accordance with the digital signal from the CPU even after the CPU stops the output of digital signals.

The offset compensation means may be designed so as to change the signal level of the offset compensation signal by fixed values until it reachs a predetermined level in case the control signal outputted from the control amplifier when the reference signal is inputted into the control amplifier has not the predetermined signal level.

Further, the offset compensation means may be designed so as to delay the output of the offset compensation signal which is executed in accordance with the signal level of the output signal from the control amplifier by a corresponding time period to the response time of the control amplifier.

Further, the offset compensation means may be designed so as to execute offset compensation at the time when activating of the feedback control apparatus in the optical recording and reproducing device is initiated.

Still further, the offset compensation means may be designed so as to execute offset compensation at the time when resetting of the feedback control apparatus in the optical recording and reproducing device is executed.

As described above, the signal level of the offset compensation signal is set by the offset compensation means so that the control signal from the control amplifier has a predetermined signal level when the reference signal is inputted into the control amplifier, the reference signal having the same signal level as that of a detection signal which is expected to be generated in the detection unit when the illuminating conditions of the light beam projected onto the recording medium are appropriate.

More specifically, since the signal level of the offset compensation signal is set such that the control signal from the control amplifier has a predetermined signal level in the case the illuminating conditions of the light beam projected onto the recording medium are appropriate, even if the minute offset in the output signal of the operational amplifier, the fluctuation in the power voltage or the like varies depending on operational amplifiers and power units, it is possible to positively prevent a DC offset from being included in the control signal from the control amplifier thereby performing stable data recording/reproducing/erasing operations on the recording medium.

Therefore, without using expensive parts or devices such as an operational amplifier of high accuracy and power unit having a high stability, it is possible to positively prevent a DC offset from being included in the control signal from the control amplifier. Moreover, there is no need to adjust the signal level of the offset compensation signal in every apparatus in the manufacturing process, and therefore the number of processes required for adjustment as well as the production cost can be reduced and the performance of the apparatus can be prevented from varying.

Even if the power condition or the environment in which the apparatus is used should change, the signal level of the offset compensation signal can be set to suit for the power condition/environment by the offset compensation means, so that a DC offset can be positively prevented from being included in the control signal outputted from the control amplifier.

What is claimed is:

1. A feedback control apparatus for an optical recording and reproducing device which records, reproduces and/or erases data to or from a recording medium by projecting a light beam from an optical head onto the recording medium, comprising:

actuator means for performing a focusing control and a tracking control of the light beam projected onto the recording medium;

detection means for detecting a focusing error and a tracking error;

switching means for selectively outputting a detected signal from said detection means or a reference signal, said reference signal having a same level as an output from said detection means when said detection means detects no focusing error and tracking error;

control amplifier means for outputting a control signal to drive said actuator means based on the detected signal; and offset compensation means for outputting an offset compensation signal to compensation an offset generated by said control amplifier means when said reference signal is inputted into said control amplifier means through said switching means, said offset compensation signal causing said control signal from said control amplifier means to be within a predetermined level;

said control signal outputted from said control amplifier means being generated by addition or subtraction of said offset compensation signal with the detected signal received by said control amplifier means.

2. The feedback control apparatus as set forth in claim 1, further comprising:

means for determining if said control signal is within said predetermined level;

said offset compensation signal being adjusted such that said control signal is within the predetermined level when said means determines that said control signal is not within the predetermined level.

3. The feedback control apparatus according to claim 1 wherein said offset compensation means comprises:

an A/D converter for converting an analog signal from said control amplifier means into a digital signal;

control means for outputting a digital signal for compensating an offset in said control amplifier means in accordance with said digital signal from said A/D converter; and a D/A converter for converting said digital signal from said control means into an analog signal thereby outputting said offset compensation signal to said control amplifier means.

4. The feedback control apparatus according to claim 3 wherein said D/A converter maintains a level of said offset compensation signal outputted in accordance with said digital signal from said control means even after said control means stops outputting digital signals.

5. The feedback control apparatus according to claim 1 wherein said offset compensation means delays outputting said offset compensation signal by a time period corresponding to a response time of said control amplifier means.

6. The feedback control apparatus according to claim 1 wherein said offset compensation means performs offset compensation operation when activating the feedback control apparatus is initiated.

7. The feedback control apparatus according to claim 1 wherein said offset compensation means performs offset compensation operation when resetting the feedback control apparatus is executed.

* * * * *